March 19, 1968

L. P. DUNCAN 3,373,720

MILKING UNIT AND PROCESS

Filed Sept. 22, 1964

INVENTOR
LLOYD P. DUNCAN

BY Mason, Mason & Albright
ATTORNEYS

March 19, 1968  L. P. DUNCAN  3,373,720
MILKING UNIT AND PROCESS
Filed Sept. 22, 1964  3 Sheets-Sheet 3

INVENTOR
LLOYD P. DUNCAN
BY
ATTORNEYS

United States Patent Office 3,373,720
Patented Mar. 19, 1968

3,373,720
MILKING UNIT AND PROCESS
Lloyd P. Duncan, Washington, Mo., assignor to Zero Manufacturing Company, Washington, Mo., a company of Missouri
Filed Sept. 22, 1964, Ser. No. 398,192
27 Claims. (Cl. 119—14.02)

This invention pertains to milking machines for use with a pipeline milking system. More particularly, the invention relates to a milking unit for cows or other milk-producing animals wherein the milk is deaerated immediately upon reaching the claw portion of the milking unit by the application of a partial vacuum within such portion and the milk is then siphoned without further entrainment of air through a pipeline milking system into a vacuum tank.

The handling of milk has long been a difficult problem. Milk always contains bacteria of various species and must therefore be handled so that their multiplication is retarded or stopped and so that the milk is not further contaminated, especially with disease-transmitting organisms. To render the organisms harmless, milk is usually pasteurized by heating it to a sufficient temperature to kill the harmful bacteria and place the milk in a sterile condition. By taking great care in the handling of milk during the milking operation and subsequent packaging operations, a substantially sterile milk can be produced wherein pasteurization is unnecessary. However, irrespective of whether the intent is to avoid pasteurization or to improve the process and resulting product, it is desirable that the milk reaching the dairy be as free from contamination and as sterile as possible.

Contemporary milk handling systems now generally in use comprise the milk can system which has been utilized for many years whereby the milk is transferred from the farm animal to the milk can and subsequently from the milk can to the dairy, and the refrigerated bulk milk tank system wherein the milk is transferred from the farm animal to the bulk milk tank wherein it is refrigerated and stored until picked up by a milk truck. For larger and even moderately sized herds, the latter system has definite economic advantages and generally the milk is brought to the dairy in a more sterile condition than is the case with milk cans.

Bulk milk tanks are generally of two types—the atmospheric tank and the vacuum tank. The atmospheric tank is, as the name indicates, open to the atmosphere and milk is either poured into the atmospheric tank or conveyed there through a pipeline system to a releaser wherein the vacuum which conveys the milk is broken and the milk is drained or otherwise conveyed to the atmospheric tank. In the vacuum tank, the milk may be drawn in by the vacuum at the tank from a pail or the vacuum tank may be tied in to a pipeline system with the milk conveyed directly to the vacuum tank due to the suction effect of the vacuum within the tank.

Pipeline milking systems which, incidentally, can also be used with milk cans as well as bulk milk tanks, may be found in a variety of sizes and types depending upon the size of the herd and the method of milking the herd. With the milking parlor wherein the cows are milked in series with only several cows in the parlor at a time, the pipeline system is usually 30 to 50 feet in length. However, in the stanchion type barn, wherein the cows are milked more or less simultaneously, the pipeline may extend from 150 to 300 feet or even more.

A modern milking machine usually comprises a set of four teat cups, each of which is connected to a pulsator which simulates the sucking motion of a calf, and milk conduits from the teat cups to a claw which is merely a manifold for the four milk conduits. From the claw the milk is drained or received in a milk receiving pail and, in most pipeline systems, vacuum is applied to the milk pipeline which has a conduit connection to the milk receiving pail. Milk is drawn from the milk receiving pail either into the releaser or into the bulk milk vacuum tank. The vacuum at the releaser or in the tank may be 20 inches or more of mercury. However, this is, generally speaking, too much to be applied to the teat cups where 13 inches of mercury have been found preferable and accordingly it is the usual practice to vent the claw or the milk receiving pail so that the vacuum inside is partially broken by the ingress of air from the atmosphere. Such air mixes with the milk entering the milking unit and the milk conveyed to the releaser or the bulk milk vacuum tank through the milk pipeline is intimately associated with entrained air. This entrained air is continually brought into the releaser or the vacuum bulk milk tank where it is eliminated by a vacuum pump. With this procedure, a larger milk pipeline and vacuum pump are required than would be the case if the air were not entrained in the milk. Also, the volume of milk is difficult to meter and an opportunity for bacteria from the air to enter the milk is substantially increased. The milk with air mixture is, of course, expansible and as a result the siphoning effect which would otherwise take place with solid stream of liquid in a confined conduit as the liquid drains downwardly into the vacuum tank does not take place. Also with an expansible material, it will be appreciated that the suction effect of the vacuum in the vacuum tank is dissipated to a greater extent by distance through the pipeline than where the liquid is not substantially expansible. Thus, with conventional pipeline systems wherein air is mixed with the milk as it is conveyed to the bulk milk tank through the pipeline, either the degree of vacuum is reduced substantially in the stalls farthest from the vacuum tank, or, alternatively, special equalizing means must be provided at additional cost.

With such conventional pipeline systems, the degree of vacuum at the teat cup is controlled largely by the degree of vacuum in the vacuum tank (forgetting for the moment the problem of the pipeline distance). Accordingly, in order to maintain a vacuum of, say, 13 inches of mercury at the teat cup, it is necessary to keep the vacuum tank at a predetermined level, say, 20 inches of mercury. However, as a matter of practicability, it is best that the vacuum in the vacuum tank be kept as high as possible. The high vacuum tends to remove off-flavor odors which may be in the milk as well as any air or gas which may be dissolved therein. Also, since the air carries with it generally a certain moisture content, the elimination of such moisture content prevents the condensation and freezing of water against the refrigerated portions of the vacuum tank as may be uncovered by milk in the tank.

It also should be kept in mind that where air is brought into the vacuum tank mixed together with the milk this in itself has a certain adverse effect upon the degree of vacuum which is attainable in the vacuum tank.

A further difficulty incident to conventional pipeline systems is that where a strainer in the line becomes clogged, the degree of vacuum at the teat cup is thereby decreased so that the teat cups have a tendency to fall off and thus bring further air into the system and injury may be done to the cow.

It is the object of this invention to overcome the foregoing problems in the pipeline milking system by the provision of a constant degree of vacuum in the teat cups which for practical purposes remains constant irrespective of the distance of the teat cups from the vacuum tank and at the same time to provide an automatic milk conveying system whereby the degree of vacuum at the teat cup is unaffected by the higher degree of vacuum in the vacuum tank so that the advantages of high vacuum within the vacuum tank can be fully realized.

It is a further object of the invention to provide immediate deaeration of the milk following its extraction from the cow's teat and to convey the milk immediately to where it may be cooled and stored under vacuum conditions.

It is a still further object of the invention to provide a milking system wherein milk may be maintained in essentially the same sterile condition in which it leaves the cow until it is delivered to a hauler or, further, up until and including the time it is delivered to the dairy.

It is a yet further object of this invention to provide in a pipeline milking system with a vacuum tank a simplified means for metering the amount of milk from individual farm animals.

Further objects and advantages will appear as the description progresses, reference being had to the accompanying drawings in which.

Figure 1:
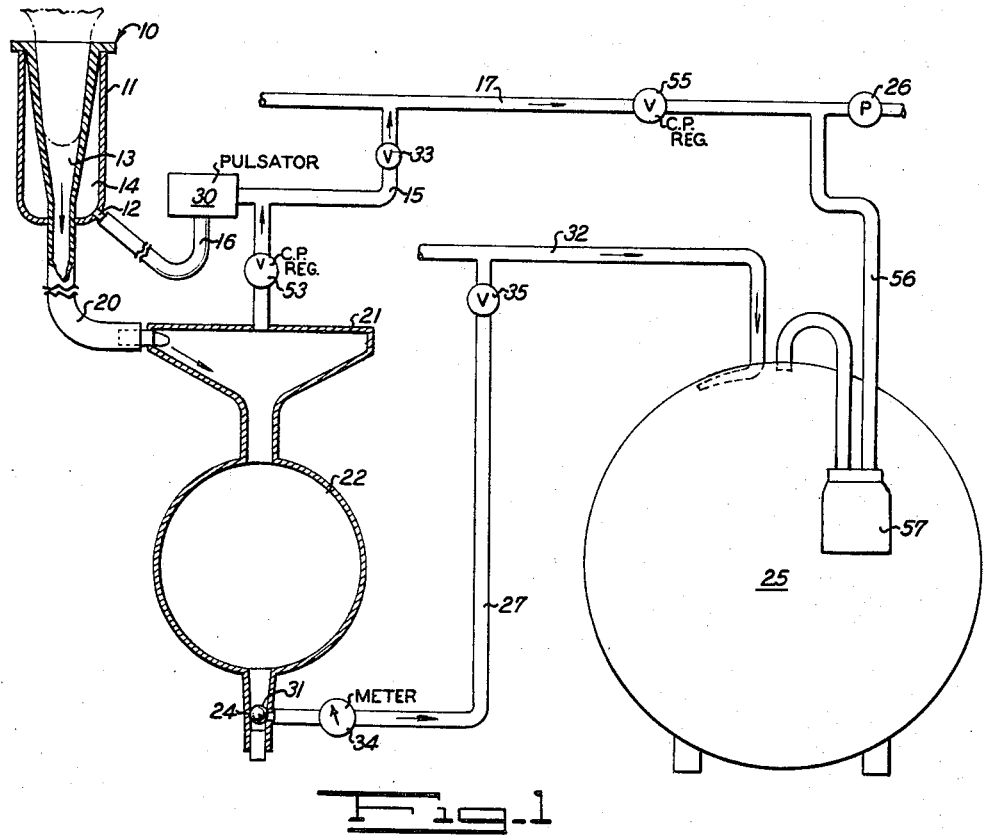
FIGURE 1 is a diagrammatic illustration of the milking system in accordance with the invention.

Referring now to FIGURE 1, a conventional teat cup 10 has a metal casing 11 with an air-vacuum pipe 12 protruding therefrom. The milk channel 13 of the teat cup is centrally disposed relative to the metal casing 11 and is so spaced therefrom as to leave an annular-shaped chamber 14 disposed inside the casing 11 and surrounding the milk channel 13. Milk channel 13 is normally made of a resilient material such as rubber or the like. A pulsator conduit 16 connects the air-vacuum pipe 12 and a pulsator 30. It will be understood that the teat cup 10 and the pulsator 30 are both conventional well-known items in the milking art. The pulsator 30 may be actuated by a solenoid or by vacuum and its function is alternately to expose the chamber 14 to atmospheric and subatmospheric pressure so as to simulate the sucking motion of a calf on a cow's teat. Leading into the other side of the pulsator 30 is a pulsator vacuum line 15 which places the pulsator 30 in communication with the deaeration vacuum line 17.

After leaving casing 11 the milk channel 13 of the teat cup 10 becomes milk hose 20 which is received by a manifold means referred to herein as claw member 21. The claw member 21 is hermetically sealed and usually made of stainless steel. Milk from the hose 20 is introduced in an appropriate manner such as tangentially to the interior surface of the claw member 21 to minimize agitation of entering milk. Underlying the claw member 21 and in direct communication therewith, is a milk receiving means which is referred to herein as a milk receiving pail 22 which is spherical in shape and connects in its lower neck 24 with the milk conduit line 27. Valve means comprising a ball float 31 which is of lower density than milk so that it will float thereon and may be composed of rubber, plastic, hollow stainless steel, or other appropriate material, is disposed within the milk receiving pail 22 whereby, when milk is substantially drained therefrom, the ball float 31 is received in the lower neck 24 and closes off communication between the milk receiving pail 22 and the milk conduit line 27. The milk conduit line 27 leads into the milk pipeline 32 and finally into the bulk milk vacuum tank 25. A bulk milk vacuum tank 25 is preferable and advantageous as part of the system for the individual milker according to the invention. However, it will be appreciated by those skilled in the art that a smaller vacuum tank such as may be found incorporated in a releaser may be utilized in lieu of a bulk milk vacuum tank. A releaser is, however, deemed disadvantageous because it promotes additional agitation and exposure to the atmosphere. Nevertheless, dairy farms already equipped with either atmospheric bulk milk tanks or which still receive milk in cans may desire to use the individual milking unit with the pipeline system initially and subsequently convert to the bulk milk vacuum tank. It is thus an advantage of the invention that the individual milking unit is adaptable to various types of milk storage so that a pipeline milking system may be converted gradually to the complete system having all the advantages of the invention and a complete change-over of equipment need not take place simultaneously.

A vacuum pump 26 produces a vacuum on the pulsator and deaeration vacuum line 17 and also upon the vacuum tank 25 through the vacuum line designated 56. The more effective the vacuum pump 26, the better it cooperates with the system. However, a practical vacuum pump which will pull normally up to 25 inches of vacuum does a satisfactory job and an even less powerful pump may suffice, the test being whether the vacuum is sufficient to move milk from the lowest part of the milk receiving pail 22 into the vacuum tank 25. In any given installation, the two main factors which will affect the rate milk is received in the vacuum tank 25 are: (1) the disposition of the vacuum tank 25 relative to the milk receiving pail 22 and (2) pipeline size and resistance. In view thereof, vacuum pump 26 need only have sufficient capacity to produce a vacuum within the vacuum tank 25 slightly in excess of that required to move milk from the bottom of the farthest milk receiving pail 22 into vacuum tank 25. With such capacity as a minimum, no maximum is prescribed for the desired degree of vacuum.

A somewhat smaller vacuum pump may be used in the system according to the invention than is required for conventional systems because it is no longer necessary to remove undue amounts of air which may be mixed with the milk as it is introduced into the vacuum tank 25.

The most important pressure to be closely regulated is that which is applied to the cow's teat. In practice it has been found that the best all around degree of vacuum here is about 13 inches of mercury. This degree of vacuum is maintained within the claw member 21 and the milk receiving pail 22 by means of a constant pressure outlet valve 53. The valve 53 exhausts air from the claw member 21 and the milk receiving pail 22 into the pulsator vacuum line 15 which is maintained at approximately 15 inches of mercury by a further pulsator line constant pressure outlet valve 55. Fifteen inches of mercury degree of vacuum is that prescribed for most commercial teat cups to insure the proper milking motion at the teat cup. However, this is largely a question of design and it will be appreciated that either the valve 55 or the valve 53 might be eliminated as long as an appropriate vacuum pressure is maintained within the claw 21. Also, in lieu of employing either or both of the regulator valves 53 and 55, a further vacuum pump or other vacuum source may be employed as long as the ultimate result is the maintenance of a vacuum of approximately 13 inches of mercury in the milker unit whereby any air entering into the unit around the teat cups is largely eliminated.

In operation the teat cups 10, of which there are of course four, are placed upon the cow's teats and at the same time the vacuum line valve 33 is opened. When this occurs, the milker unit including the milk hose 20, the claw member 21, and the milk receiving pail 22, which previously contained air at atmospheric pressure, has the air evacuated therefrom through the valve 53 until an internal vacuum of 13 inches of mercury is reached. With the start of the pulsator 30, which may be immediate, milk is delivered into the milk channel 13 and drained through the milk hose 20 into the claw member 21 wherefrom it swirls downwardly into the milk receiving pail 22. Any air which may have been admitted between the cow's teat and the milk channel 13 is drawn from the milk as it flows along the interior surface of the claw member 21 and is exhausted through the valve 53, the pulsator vacuum line 15, the pulsator and deaeration vacuum line 17, the valve 55, and finally into the vacuum pump 26.

It is to be understood that the vacuum pump 26 has been previously started in order to draw within the vacuum tank 25 a vacuum of 20 or more inches of mercury and this vacuum communicates through the milk pipeline 32 and a milk conduit line 27 to the lower neck 24 of the milk receiving pail 22. Accordingly, with atmospheric pressure within the milk receiving pail 22 the ball float 31 is firmly seated against the outlet to the milk conduit line 27 and there is no fluid movement from the milk receiving pail 22 into the vacuum tank 25. With the establishment of 13 inches of vacuum within the milk receiving pail 22, the pressure seating the ball float 31 is considerably reduced, but nevertheless the ball float 31 is maintained by the pressure differential in its position against the outlet into the milk conduit line 27 and such fluid leakage as may occur is too minimal to adversely affect the degree of vacuum within the claw member 21. Optionally, a metering device 34 of any type well known to the art may be placed in the milk conduit line 27. The system is advantageous for this purpose since milk without air entrained therein may be metered very accurately. As milk enters into the milk receiving pail 22 which is normally too small to receive the entire milking from a cow, the buoyancy of the ball float 31 causes it to overcome the differential in pressure within the milk receiving pail 22 and the milk conduit line 27 so that it is dislodged and milk is drawn from the milk receiving pail 22 into the milk conduit line 27 and finally through the milk pipeline 32 into the vacuum tank 25. The size of the outlet from the lower neck 24 of the milk receiving pail 22 into the milk conduit line 27 is appropriately gauged so that during the normal milking of the farm animal some milk will be contained within the milk receiving pail 22 as long as the milk operation continues. Thus, the flow into the milk conduit line 27 is not exposed to the shocks which might occur if the ball float 31 were constantly seating and unseating over the milk conduit line 27 outlet. The rate of milk flow may also be regulated by a self-cleaning damper type valve 35 appropriately placed in the milk conduit line 27. If desired, the buoyancy of the ball float 31 may be such that it will not normally be dislodged from the outlet of the milk conduit line 27 unless the milk receiving pail 22 is near its desired internal vacuum of 13 inches of mercury. This is somewhat advantageous in that when the system is started the milk receiving pail 22 is evacuated of air before the conveyance of milk through the milk conduit line 27 commences. Since the milk which enters the milk conduit line 27 from the lower neck 24 has little if any air mixed into it and accordingly is a solid stream of liquid until it enters into the vacuum tank 25, a siphoning effect occurs in the pipeline 32 as it goes down into the vacuum tank and in part due to this effect, it is possible to convey the milk by means of the differential degrees of vacuum of 13 inches of mercury within the milk receiving pail 22 and 20 or more inches of mercury within the vacuum tank 25. Accordingly, any rise in the pipeline 32 above the vacuum tank 25 is compensated by the siphoning effect which occurs in the downward turn of the pipeline 32 to inside of the vacuum tank 25, subject, of course, to the fact that the milk cannot be moved upwardly beyond the height corresponding to the absolute pressure within the milk receiving pail 22. It will also be understood that since the milk being conveyed in the milk conduit line 27 and the pipeline 32 is not mixed with air, these lines need not be as large as is conventionally necessary in pipeline systems and, accordingly, are more economical.

When the milking operation for any particular farm animal is complete, as shown by the absence of any milk entry into the milk receiving pail 22 and the seating of the ball float 31 against the outlet to the milk conduit line 27, the teat cups then may be removed and if the same individual milking unit is not to be employed with a further farm animal the valves 33 and 35 will be permanently secured.

Figure 5:
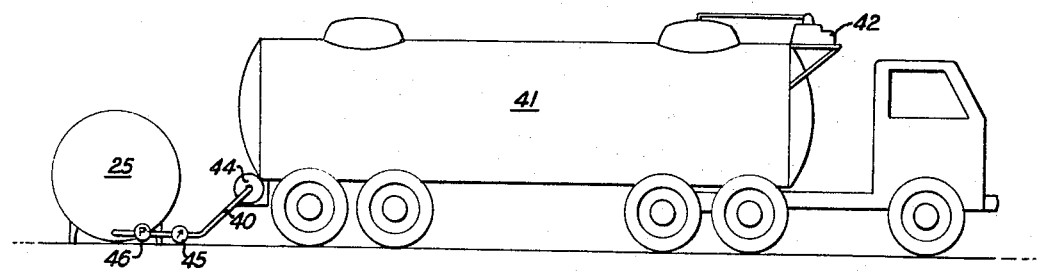
FIGURE 5 shows a mobile bulk vacuum milk tank which may be utilized in conjunction with the invention.

Milk entering the milk vacuum tank 25 is stored under a vacuum of 20 to 25 inches of mercury which both tends to remove any air which may have mixed into the milk despite the deaeration at the claw 21 and further to remove off-odors from the milk. Within the vacuum tank 25, the milk is refrigerated in the normal manner and due to the minimal contact with the air it is maintained in a sterile condition for a relatively long period of time for a commodity such as milk. It is recommended, however, that the milk be removed at least every other day to ensure that milk delivered to the dairy has a minimal bacterial level. With conventional bulk milk handling systems, a hauler transfers the milk from the bulk storage tank to a mobile milk tank usually every other day and carries it to the dairy. Conventional mobile tanks are generally made of stainless steel and are without refrigeration. With a bulk milk vacuum tank the usual practice is to break the vacuum in the tank when or before the hauler arrives, and the hauler, after testing and measuring the milk, pumps it into the mobile tank where it will be subsequently conveyed into the dairy. While the hauler maintains his mobile tank in a sterile condition, nevertheless the milk within such tank is subjected to a certain amount of agitation by reason of the movement of the truck over the roads and, moreover, the milk which was previously unexposed to air at atmospheric pressure is brought into contact with the air and therefore is not delivered to the dairy in the same sterile condition as previously obtained within the vacuum tank 25. This disadvantage can be overcome by making the tank of the hauler a vacuum tank such as shown in FIGURE 5. It will be appreciated by those skilled in the art that this need not be refrigerated since the rise in temperature of the bulk milk in conventional tanks is usually only two to three degrees Fahrenheit at the most before the milk is delivered to the dairy.

Referring now to FIGURE 5, the hauler brings his mobile bulk milk vacuum tank 41 to the vicinity of the vacuum tank 25 which still has vacuum applied thereto. A drainpipe on the vacuum tank 25 is connected by a milk withdrawal hose 40 to the inlet of the mobile unit milk pump 44 which is carried adjacent the mobile bulk milk vacuum tank 41. It will be appreciated that the pump 44 cannot be any great distance higher than the level of the milk in the tank 25 if it is to be effective while the vacuum is maintained within the tank 25. Present practice requires that the hauler test the milk before transferring same to his tank, and accordingly a small milk test extraction pump 46 is indicated diagrammatically on the milk withdrawal hose 40 for this purpose. Also, a hauler metering device is indicated diagrammatically by reference numeral 45 as incorporated in the milk withdrawal hose 40. However, this equipment is optional and other means to accomplish the same results may be substituted. For example, a withdrawable measuring stick may be incorporated within the tank, the measuring stick including a container part for the extraction of test amounts of milk. It is not within the ambit of this invention to describe these items in detail since they are well within the skill of those who practice the art.

A vacuum is maintained within the mobile bulk milk vacuum tank 41 by means of a mobile unit vacuum pump 42 which is carried together with the tank 41. This vacuum will be approximately equivalent to that within the tank 25, that is to say, 20 to 25 inches of mercury. When the milk withdrawal hose 40 connects the tank 25 to the tank 41 and the pump 44 commences pumping operation, it will be appreciated by those skilled in the art that when the tank 25 is substantially filled, its withdrawal will substantially increase the degree of vacuum within the tank 25 and thus enhance the withdrawal of dissolved gas and off-flavor odors from the milk. When the tank 25 has been emptied of milk, the connections to the hose 40 may be secured and the hauler, when he completes his rounds, discharges the sterile milk from the mobile vacuum bulk milk tank 41 to the dairy where it may again be received by a tank cleared substantially of air. Milk so transported literally from the cow's teat to the dairy without substantial contact with the air is in a sterile condition and may, if desired, be marketed as same. However, if pasteurization is desired, it will be appreciated that milk following pasteurization is improved over that which was not of such sterile quality when it arrived at the dairy. Also, it is of great importance that any off-flavors which may have accumulated in the milk have largely been eliminated by the exposure of constant vacuum. This can be of particular significance to the dairy farmer and the dairy in certain seasons of the year when the farm animal consumes plants such as wild onions which may impart an off-flavor to the milk.

As has been previously indicated, the system involved is of greatest advantage in a bulk milk tank system as opposed to a milk can system and, within the bulk milk tank system, with a bulk milk vacuum tank as opposed to an atmospheric tank. And it is of still further advantage where the hauler employs a mobile bulk vacuum milk tank so that the milk may be transported to the dairy without exposure to air. However, in order for it to be economical to utilize the conventional mobile milk tank to haul milk, it is essential that a substantial number of the dairy farms use the bulk milk tank system. And for economical utilization of a mobile vacuum milk tank, a substantial number of the dairy farms in the vicinity should have bulk milk vacuum tanks such as tank 25. In areas where neither of such systems have been inaugurated, and the dairy farmer desires to deliver sterile milk to a dairy, or for large diary farms having a sufficient herd to fill a mobile bulk milk vacuum tank, it may be advantageous to provide instead of two pieces of equipment, that is, the vacuum tank 25 and the mobile bulk vacuum milk tank 41, refrigeration of the mobile bulk milk vacuum tank 41 and incorporate the same in the system with the milk received directly from milk pipeline 32 directly into such a mobile refrigerated bulk milk vacuum tank 41. With such a procedure, when the mobile bulk milk tank 41 is filled, it is simply disconnected from the pipeline system and the milk is transported to the dairy. In this respect it will be understood that although a relatively large tank is shown in FIGURE 5, the tank may be scaled down considerably to suit the needs of the herd involved.

Figure 2:
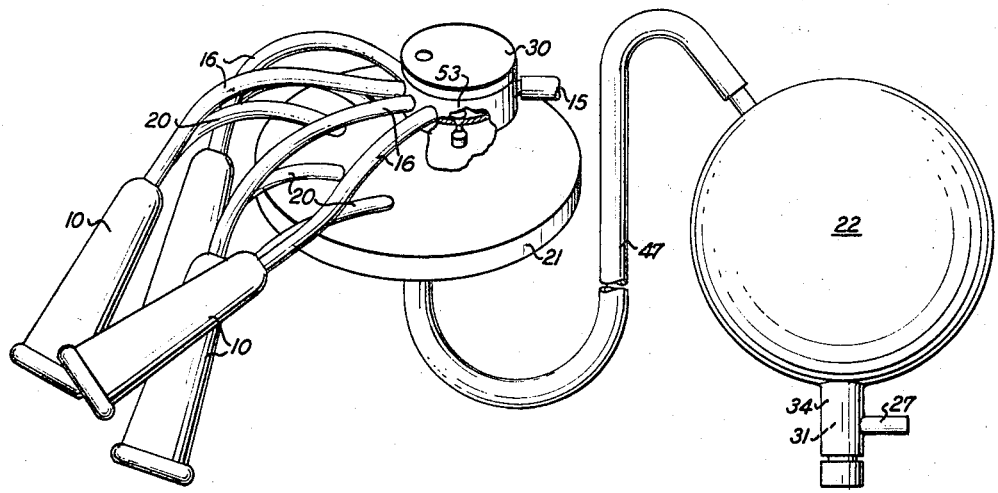
FIGURE 2 is a perspective view showing part of the milking barn and the milk receiving room.
Figure 3:
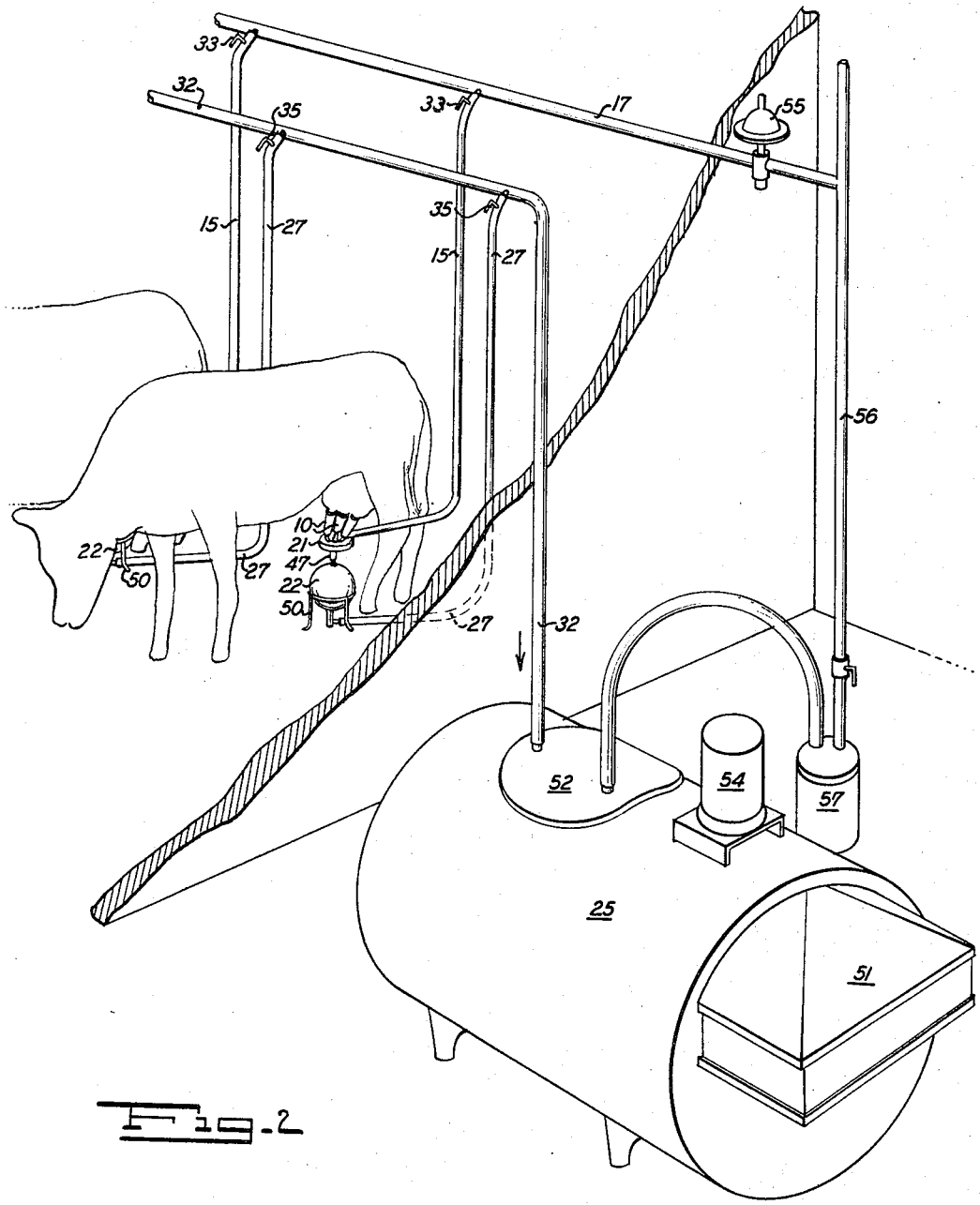
FIGURE 3 is a perspective view of an individual milking unit.

From FIGURES 2 and 3, it may be noted that a milk connection line 47 may be provided between the claw member 21 and the milk receiving pail 22. In operation, a stand 50 is provided to support a glass milk receiving pail 22. The vacuum tank 25 includes a compressor-condenser 51 for providing refrigeration for the vacuum tank 25. The milk pipeline 32 enters the vacuum tank 25 through a lid 52. A motor 54 provides motive means to a shaft extending within the vacuum tank 25 to agitate the milk gently. The vacuum line 56 also connects to the vacuum tank 25 through the lid 52 with a trap 57 interposed within the line to prevent contamination of the milk within the vacuum tank 25.

The valve 53 of FIGURE 1 may consist merely of a weighted valve interposed between the claw member 21 and the pulsator 30 whereby when the pressure within the claw member 21 is two or more pounds greater than the pressure within the pulsator the valve is opened by the pressure within the claw member 21 to vent excess air from within the claw member 21. As long as the vacuum within the pulsator vacuum line 15 is maintained at approximately 15 inches of mercury (even though lowered periodically as a result of the pulsations of the pulsator 30) a substantially constant degree of vacuum of 13 inches of mercury will be maintained within the claw member 21.

Figure 4:
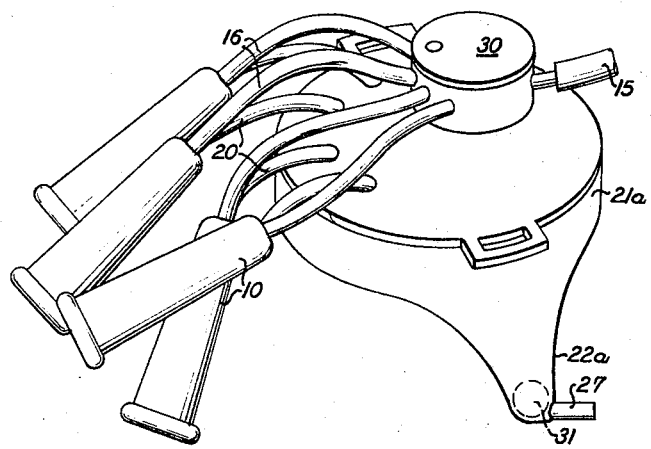
FIGURE 4 is a further perspective view of a modified individual milking unit in accordance with the invention.

FIGURE 4 shows a modified milking unit which may be if desired strapped onto the cow. In this system the manifold means heretofore referred to as the claw member has been designated 21a and the milk receiving means referred to as the receiving pail has been designated 22a. It will be noted that conventional teat cups 10 have pulsator conduits leading therefrom to pulsator 30 and a set of milk hoses 20 received by the claw member 21a. It will be noted that the claw member 21a and the milk receiving pail 22a are contiguous. Valve means comprising ball float 31, or any other suitable structure as would occur to one skilled in the art, is received in the lower part of the milk receiving pail 22a and closes off communication between the milk receiving pail 22a and the milk conduit line 27 responsive to the milk level in pail 22a. The vacuum line 15 connects the claw member 21a with a lesser degree of vacuum than that communicated to conduit 27, as has been previously described. This type of unit is advantageous in that it is not likely to be knicked over by the cow. By increasing the capacity of the milk receiving pair 22a, interruptions in the flow of milk in the milk conduit line 27 may be eliminated.

It is to be realized that the foregoing detailed description has been given for clearness of understanding only and no unnecessary limitations should be understood therefrom inasmuch as modifications will be obvious to those skilled in the art.

Having thus described my invention what I claim as new and desire to secure by Letters Patent of the United States is:

1. A pipeline milking system which comprises a set of teat cups, each of said teat cups including a central channel and a jacket surrounding said channel, a pulsator, a first conduit interconnecting said jacket and said pulsator, a claw, a second conduit interconnecting said milk channel and said claw, a milk receiving pail underlying said claw, a pulsator line under a first degree of vacuum operatively connected to said pulsator, a milk tank under a second degree of vacuum which is higher than said first degree of vacuum, a milk line connected to and leading from said milk receiving pail to said vacuum tank, valve means associated with said milk receiving pail and said milk line responsive to the level of milk in said milk receiving pail whereby the connection from said milk receiving pail is opened when milk is in said milk receiving pail and is closed when said milk receiving pail is substantially empty, and a line interconnecting the upper part of said claw to said pulsator line whereby any gaseous fluids entering with said milk into said claw are withdrawn by said vacuum in said pulsator line.

2. A pipeline system of milking in accordance with claim 1 wherein said valve means constitutes a ball valve.

3. A pipeline milking system in accordance with claim 1 wherein a reducing valve is incorporated in said line interconnecting the upper part of said claw with said pulsator line operating to maintain the degree of vacuum in said pulsator line higher than the vacuum in said claw.

4. A pipeline milking system in accordance with claim 3, wherein the vacuum in said pulsator line is about 15 inches of mercury and the vacuum in said claw is about 13 inches of mercury.

5. A pipeline milking system in accordance with claim 1, wherein the vacuum in said pulsator line is about 15 inches of mercury and the vacuum in said milk tank is of a sufficiently higher degree whereby pressure on milk in said milk receiving pail moves milk through said milk line into said milk tank.

6. A pipeline milking system which comprises a set of teat cups, each of said teat cups including a central milk channel and a jacket surrounding said channel, a pulsator, a first conduit interconnecting said jacket and said pulsator, a claw, a second conduit interconnecting said milk channel and said claw, a milk receiving pail underlying and in direct communication with said claw, a vacuum source interconnected to the upper part of said claw, a milk tank under a higher degree of vacuum than said vacuum source, a milk line connected and leading from said milk receiving pail to said vacuum tank, a valve means associated with said milk receiving pail and said milk line responsive to the level of milk in said pail whereby the connection from said milk receiving pail to said vacuum tank is opened when milk is in said milk receiving pail and is closed when said milk receiving pail is substantially empty.

7. A pipeline milking system in accordance with claim 6 wherein said valve means constitutes a ball valve.

8. A pipeline milking system in accordance with claim 6 wherein said pulsator is connected to an actuated by said vacuum source.

9. A pipeline milking system in accordance with claim 6 wherein said vacuum source maintains a vacuum of about 15 inches of mercury.

10. A pipeline milking system in accordance with claim 9 wherein a reducing valve is included in the connection of said claw to said vacuum source whereby the degree of vacuum in said claw is maintained at about 13 inches of mercury.

11. A pipeline milking system in accordance with claim 10 wherein the vacuum in said milk tank is sufficiently higher in degree than the vacuum in said claw whereby pressure on said milk in said milk receiving pail moves milk through said line into said milk tank.

12. A pipeline milking system in accordance with claim 6 wherein a milk metering device is interposed in said milk line.

13. A pipeline system of milking which comprises a vacuum pump, a vacuum tank operatively connected to said vacuum pump, a pipeline operatively connected to said vacuum pump, a milk line directly communicating with said vacuum tank, a plurality of conduit entrances in said pipeline, a plurality of milk inlet connections in said milk line, vacuum conduit means, milk conduit means, a set of teat cups, a claw, a milk passage line leading from said teat cups into said claw, a milk receiving pail lower than and close to said claw whereby milk drains from said claw into said milk receiving pail, said vacuum conduit means interconnecting the upper portion of said claw to one of said conduit entrances, said milk conduit means interconnecting the lower portion of said milk receiving pail to one of said milk inlet connections, valve means adapted to close said milk conduit means, said valve means responsive to the level of milk in said milk receiving pail whereby said valve is opened when milk is in said milk receiving pail and is closed when said milk receiving pail is substantially empty, and a pressure reducing valve in said pipeline adapted to maintain the degree of vacuum in said pipeline less than that maintained in said vacuum tank whereby the pressure in said milk receiving pail moves milk therein through said milk conduit means and said milk line into said vacuum tank.

14. A pipeline system in accordance with claim 13 wherein a further pressure reducing valve is interposed in said vacuum conduit means.

15. A pipeline system of milking which comprises a vacuum pump, a vacuum tank operatively connected to said vacuum pump, a vacuum pipeline system connected to said vacuum pump, a pressure reducing means incorported in said vacuum pipeline system to maintain vacuum therein at a predetermined degree lower than the vacuum in said tank, a milk line system communicating directly into said vacuum tank, a set of teat cups, a claw, a milk passage line leading from said teat cups into said claw, a milk receiving pail lower than and close to said claw whereby milk drains from said claw into said pail, said claw connected with said vacuum pipeline system whereby any gaseous fluids entering said claw are diffused in said vacuum, said milk receiving pail connected with said milk line system whereby milk in said milk receiving pail is withdrawn through said milk line system into said vacuum tank, and valve means associated with said milk line system responsive to the presence of milk in said milk receiving pail whereby the passage from said milk receiving pail through said milk line system is closed when said milk receiving pail is substantially empty.

16. In combination with a pipeline milking system including vacuum producing means with a vacuum pipeline system and a vacuum tank connected thereto and with a milk conveying conduit system leading into said vacuum tank, an individual milking unit which comprises a set of teat cups, milk passage conduits leading from said teat cups, a claw receiving said milk passage conduits, a vacuum conduit included in said vacuum pipeline system communicating with said claw, a milk receiving pail lower than and close to said claw whereby milk received in said claw drains into said milk receiving pail, a connection in the lower portion of said milk receiving pail connecting to said milk conveying conduit system, pressure reducing means associated with said vacuum pipeline system whereby the degree of vacuum in said tank is sufficiently greater than the degree of vacuum in said milk receiving pail so that milk is withdrawn from said milk receiving pail through said milk conveying conduit into said vacuum tank, and valve means associated with said unit responsive to milk in said milk receiving pail whereby the flow of milk from said unit to said tank is closed when said milk receiving pail is empty.

17. A method of deaerating and conveying milk from a milk-producing farm animal to a vacuum tank which comprises the steps of withdrawing milk from a farm animal directly into a claw, continually taking any gaseous fluid received with said milk in said claw by subjecting it to partial pressure substantially less than atmospheric pressure, continually draining said milk from said claw by gravity into a milk receiving pail, conveying milk from said milk receiving pail through a conduit to said vacuum tank by maintaining therein a partial pressure substantially less than said first mentioned partial pressure, and stopping said conveying of milk by closing said conduit whenever said milk receiving pail is substantially empty.

18. A method of deaerating and conveying milk from a milk producing animal to a dairy without exposure of the milk to the atmosphere which comprises withdrawing milk from the teats of a farm animal directly into a claw by a partial vacuum, continually withdrawing any gaseous fluid received with said milk entering said claw by subjecting it to a partial vacuum in said claw, continually withdrawing said milk from said claw by gravity into a mlik receiving pail, conveying milk from said milk receiving pail through a conduit to a bulk milk vacuum tank by maintaining a partial vacuum of greater degree in said vacuum tank than in said claw, stopping said conveying of milk by closing said conduit whenever said milk receiving pail is substantially empty, cooling the milk received in said vacuum tank, connecting said vacuum tank with a conduit to a mobile vacuum tank and conveying said milk through said conduit into said mobile vacuum tank while maintaining a partial vacuum in said mobile vacuum tank, hauling said mobile vacuum tank with a partial vacuum maintained therein to a dairy and discharging said milk to a further tank devoid of atmosphere at said dairy.

19. A method of deaerating and conveying milk from a milk producing farm animal to a dairy without exposure to the atmosphere which comprises the steps of withdrawing milk from the teats of the farm animal directly into a claw by a partial vacuum, continually withdrawing any gaseous fluid received with said milk in said claw by subjecting it to a partial vacuum in said claw, continually withdrawing milk from said claw by gravity into a milk receiving pail, conveying milk from said milk receiving pail through a conduit to a refrigerated mobile bulk milk vacuum tank by maintaining a partial vacuum to a greater degree in said vacuum tank than in said claw, stopping said conveying of milk by closing said conduit whenever said milk receiving pail is substantially empty, cooling the milk received in said vacuum tank, hauling said mobile bulk milk vacuum tank with a partial vacuum maintained therein to a dairy, and discharging said milk into a further milk receiving tank at said dairy.

20. Milking apparatus for farm animals which comprises a set of teat cups, manifold means, a set of conduits interconnecting said teat cups and said manifold means whereby milk received in said teat cups is conveyed through said conduits to said manifold means, milk receiving means underlying said manifold means, a first source of vacuum, a second source of vacuum which is substantially higher than said first source of vacuum, said first source of vacuum operatively connected to said manifold means whereby milk entering said manifold means from said conduits is exposed to said first source of vacuum, a discharge outlet from said milk receiving means, said second source of vacuum operatively connected to said discharge outlet whereby milk received in said milk receiving means is drawn therefrom through said discharge outlet, and valve means for selectively opening and closing said discharge outlet responsive to the level of milk in said milk receiving means.

21. A milking system comprising an operating vacuum pipe, a teat cup having a pulsation tube and a milk outlet tube, means including a pulsator connecting said pulsation tube to said operating vacuum pipe, a claw connected to the milk outlet tube, a milk-collecting pipe leading from the lower part of said claw, means for maintaining a substantially constant vacuum in said operating vacuum pipe while maintaining a substantially higher vacuum in said milk-collecting pipe, and a duct connecting the upper part of the claw to said operating vacuum pipe independently of said pulsator.

22. A system according to claim 21, comprising also valve means in the claw operable to cut off the discharge of milk therefrom to said milk-collecting pipe in response to a predetermined lowering of the milk level in said claw.

23. A pipeline milking system which comprises a set of teat cups, each of said teat cups including a central channel and a jacket surrounding said channel, a pulsator, a first conduit interconnecting said jacket and said pulsator, a claw, a second conduit interconnecting said milk channel and said claw, a lower portion of said claw constituting a milk receiving pail, a pulsator line under a first degree of vacuum operatively connected to said pulsator, a milk tank under a second degree of vacuum which is higher than said first degree of vacuum, a milk line connected to and leading from said milk receiving pail to said vacuum tank, valve means associated with said milk receiving pail and said milk line responsive to the level of milk in said milk receiving pail whereby the connection from said milk receiving pail is opened when milk is in said milk receiving pail and is closed when said milk receiving pail is substantially empty, and a line interconnecting the upper part of said claw to said pulsator line whereby any gaseous fluids entering with said milk into said claw are withdrawn by said vacuum in said pulsator line.

24. A pipeline milking system which comprises a set of teat cups, each of said teat cups including a central milk channel and a jacket surrounding said channel, a pulsator, a first conduit interconnecting said jacket and said pulsator, a claw, a second conduit interconnecting said milk channel and said claw, a lower portion of said claw constituting a milk receiving pail in direct communication with said claw, a vacuum source interconnected to the upper part of said claw, a milk tank under a higher degree of vacuum than said vacuum source, a milk line connected and leading from said milk receiving pail to said vacuum tank, a valve means associated with said milk receiving pail and said milk line responsive to the level of milk in said pail whereby the connection from said milk receiving pail to said vacuum tank is opened when milk is in said milk receiving pail and is closed when said milk receiving pail is substantially empty.

25. A method of deaerating and conveying milk from a milk-producing farm animal to a vacuum tank which comprises the steps of withdrawing milk from a farm animal directly into a claw, continually taking from the milk any gaseous fluid received with said milk in said claw by subjecting an upper portion of the claw to partial pressure substantially less than atmospheric pressure, conveying milk from the lower portion of said claw through a conduit to said vacuum tank by maintaining therein a partial pressure substantially less than said first mentioned partial pressure, and stopping said conveying of milk by closing said conduit whenever said claw is substantially empty.

26. A method in accordance with claim 17 wherein during at least part of the milking operation said milk is conveyed through said conduit to said vacuum tank in a solid stream and a siphoning action takes place in said conduit whereby the conveying of said milk is augmented.

27. A method in accordance with claim 25 wherein during at least part of the milking operation said milk is conveyed through said conduit to said vacuum tank in a solid stream and a siphoning action takes place in said conduit whereby the conveying of said milk is augmented.

References Cited

UNITED STATES PATENTS

| | | | |
|---|---|---|---|
| 2,616,809 | 11/1952 | Graves. | |
| 2,805,643 | 9/1957 | Hill | 119—14.07 |
| 2,920,641 | 1/1960 | Girolo | 119—14.06 X |
| 3,172,391 | 3/1965 | Norton | 119—14.28 |
| 3,187,719 | 6/1965 | Jones | 119—14.08 |
| 3,189,002 | 6/1965 | Noorlander | 119—14.07 |

HUGH R. CHAMBLEE, *Primary Examiner.*

SAMUEL KOREN, *Examiner.*